United States Patent
Denny, Jr. et al.

(10) Patent No.: US 6,532,666 B1
(45) Date of Patent: Mar. 18, 2003

(54) PROCESS FOR CAPTURING A BEARING RACE ON A SPINDLE

(75) Inventors: Wayne V. Denny, Jr., Alliance, OH (US); Praveen M. Pauskar, North Canton, OH (US); Keith W. Reese, Massilon, OH (US)

(73) Assignee: The Timken Company, Canton, OH (US)

( * ) Notice: Subject to any disclaimer, the term of this patent is extended or adjusted under 35 U.S.C. 154(b) by 0 days.

(21) Appl. No.: 09/997,603

(22) Filed: Nov. 29, 2001

(51) Int. Cl.[7] ............................................. B21D 53/10
(52) U.S. Cl. ............................. 29/898.06; 29/407.05; 29/715; 29/725
(58) Field of Search ........................... 29/898.06, 724, 29/725, 898.07, 898, 715, 714, 512, 407.01, 407.05; 384/585, 543, 544, 537

(56) References Cited

U.S. PATENT DOCUMENTS

| | | | |
|---|---|---|---|
| 4,893,960 A | | 1/1990 | Beier et al. |
| 5,226,738 A | | 7/1993 | Valette et al. |
| 5,240,333 A | | 8/1993 | Hassiotis et al. |
| 5,490,732 A | | 2/1996 | Hofmann et al. |
| 5,596,798 A | | 1/1997 | Hofmann et al. |
| 5,822,859 A | * | 10/1998 | Kessen et al. |
| 5,911,458 A | * | 6/1999 | Bywalez et al. |
| 6,398,419 B1 | * | 6/2002 | Kashiwagi et al. |

FOREIGN PATENT DOCUMENTS

| | | |
|---|---|---|
| GB | 2233404 A | 9/1991 |
| WO | WO9825772 | 6/1998 |
| WO | WO9858762 | 12/1998 |

* cited by examiner

Primary Examiner—Gregory M. Vidovich
Assistant Examiner—T. Nguyen
(74) Attorney, Agent, or Firm—Polster, Lieder, Woodruff & Lucchesi, L.C.

(57) ABSTRACT

A hub assembly includes a hub having a flange and a spindle projected from the flange, a housing located around the hub spindle, and an antifriction bearing between the housing and the spindle. The bearing includes an inner race which the spindle initially accommodates in that the spindle has a deformable end over which the inner race is passed. Thereafter, the deformable end is upset into a formed end in a rotary forming procedure that involves forcing the deformable end and a forming tool together while the spindle and tool rotate. The formed end should bear snugly against a back face on the inner race and capture the inner race on the spindle. In the forming procedure the spindle and forming tool are forced together initially in a coarse feed which provides the formed end that bears against the back face of the inner race, then at a fine feed, and finally at a dwell. The force is monitored throughout; A force or rate of change of force which fails to meet certain established criteria will result in the rejection of the hub assembly that experiences that force or rate. For example, the force approaching the end of the fine feed must increase at a rate that exceeds a prescribed minimum rate; the force at the end of the fine feed must not exceed a prescribed maximum and perhaps exceed a prescribed minimum, the force approaching the end of the dwell must exceed a prescribed minimum and must decrease at a rate above a prescribed minimum rate.

19 Claims, 4 Drawing Sheets

PROCESS FOR CAPTURING A BEARING RACE ON A SPINDLE

CROSS REFERENCE TO RELATED APPLICATIONS

None

STATEMENT REGARDING FEDERALLY SPONSORED RESEARCH OR DEVELOPMENT

None

BACKGROUND OF THE INVENTION

This invention relates in general to hub assemblies, and more particularly to a process for capturing a bearing race on a spindle by deforming the spindle behind the race.

Most automobiles of current manufacturing, and many sport utility vehicles as well, have their front and rear wheels independently suspended. Typically, on such a vehicle, each road wheel is attached to a suspension system component, such as a steering knuckle, through a hub assembly, which more often than not is supplied to the automobile manufacturer as a packaged unit. Basically, such a unit includes a housing which is bolted to the suspension system component, a hub to which the road wheel is bolted along with a brake disk or drum, and an antifriction bearing which is located between the hub and the housing to enable the hub to rotate in the housing with minimal friction. The hub has a flange against which the wheel is fastened and a spindle which projects from the hub into the housing. The bearing includes outer and inner raceways carried by the housing and the hub spindle, respectively, and rolling elements, such as tapered rollers or balls, arranged in two rows between the outer and inner raceways, with the raceways being oriented to enable all of the rolling elements to transfer radial loads and the rolling elements of the one row to take thrust loads in one direction and the rolling elements of the other row to take thrust loads in the other direction. In order to assemble such a unit, at least one of the raceways must reside on a race that is initially separate from the housing or hub spindle which carries the raceway. Typically, it is the inboard inner race that is carried by the spindle. It usually resides on a cone, where the bearing is a tapered roller bearing, or a ring, where the bearing is an angular contact ball bearing. This inner race requires some type of abutment to retain it on the spindle.

One procedure for providing the abutment to retain the initially separate inner race involves upsetting the end of the spindle after the inner race is installed over the spindle. Initially, the spindle extends beyond the inner race. Then the extended portion of the spindle is deformed outwardly and backwardly against the inner race to provide a formed end which captures the inner race on the spindle. International application PCT/GB98/01823, published under International Publication No. WO98/58762, discloses a procedure and machine for upsetting the end of a hub spindle.

However, if the end of the spindle is deformed too forcefully against the inner race, the inner race may actually deform and detract from the operation of the bearing. On the other hand, the end of the spindle may not deform to the extent required to maintain a desired setting in the bearing, usually preload. In this event, a gap will usually exist between the initially separate inner race and the deformed end, in which event the bearing may operate with excessive end play. That reduces the size of the load zone in the bearing, in that it concentrates the radial load in relatively few rollers. Moreover, it leaves the spindle free to wobble in the housing which can damage the seals at the end of the bearing. Thus, the end of the spindle must be deformed with a good measure of precision.

BRIEF SUMMARY OF THE INVENTION

The present invention resides in a process which upsets a deformable end on a spindle to create a formed end which captures a bearing race on the spindle. The spindle and a forming tool are forced together, with the deformable end being against the forming tool, and the force exerted is great enough to deform the end outwardly. That force is monitored during the deformation and a subsequent dwell. If the force fails to satisfy certain criteria, the hub assembly may not be satisfactory.

BRIEF DESCRIPTION OF THE SEVERAL VIEWS OF THE DRAWINGS

Corresponding reference characters indicate corresponding parts throughout the several views of the drawings.

DETAILED DESCRIPTION OF INVENTION

Figure 1:
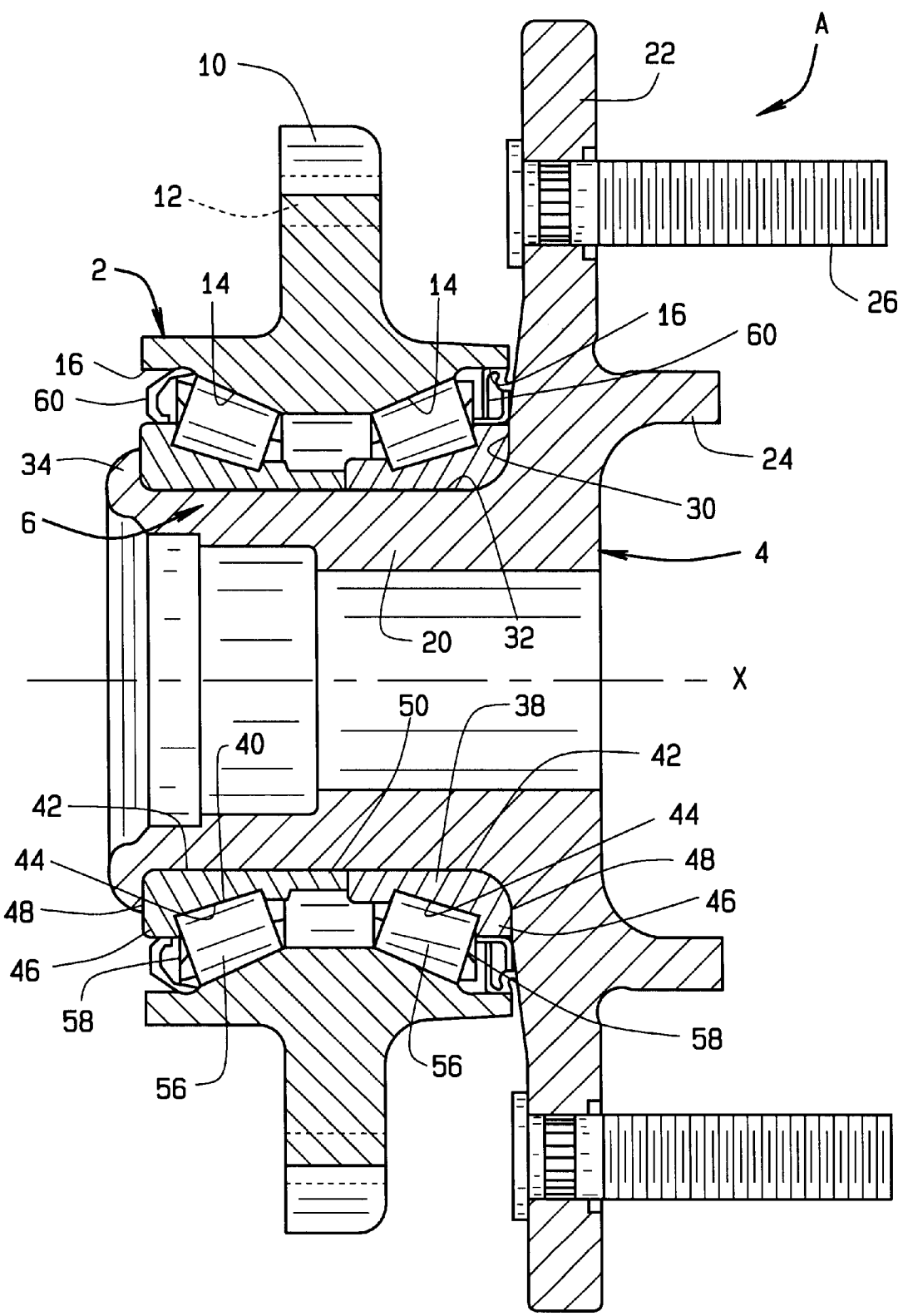
FIG. 1 is a longitudinal sectional view of a hub assembly having a spindle, the end of which is upset in accordance with the process of the invention to retain a bearing race on the spindle.
Figure 4:
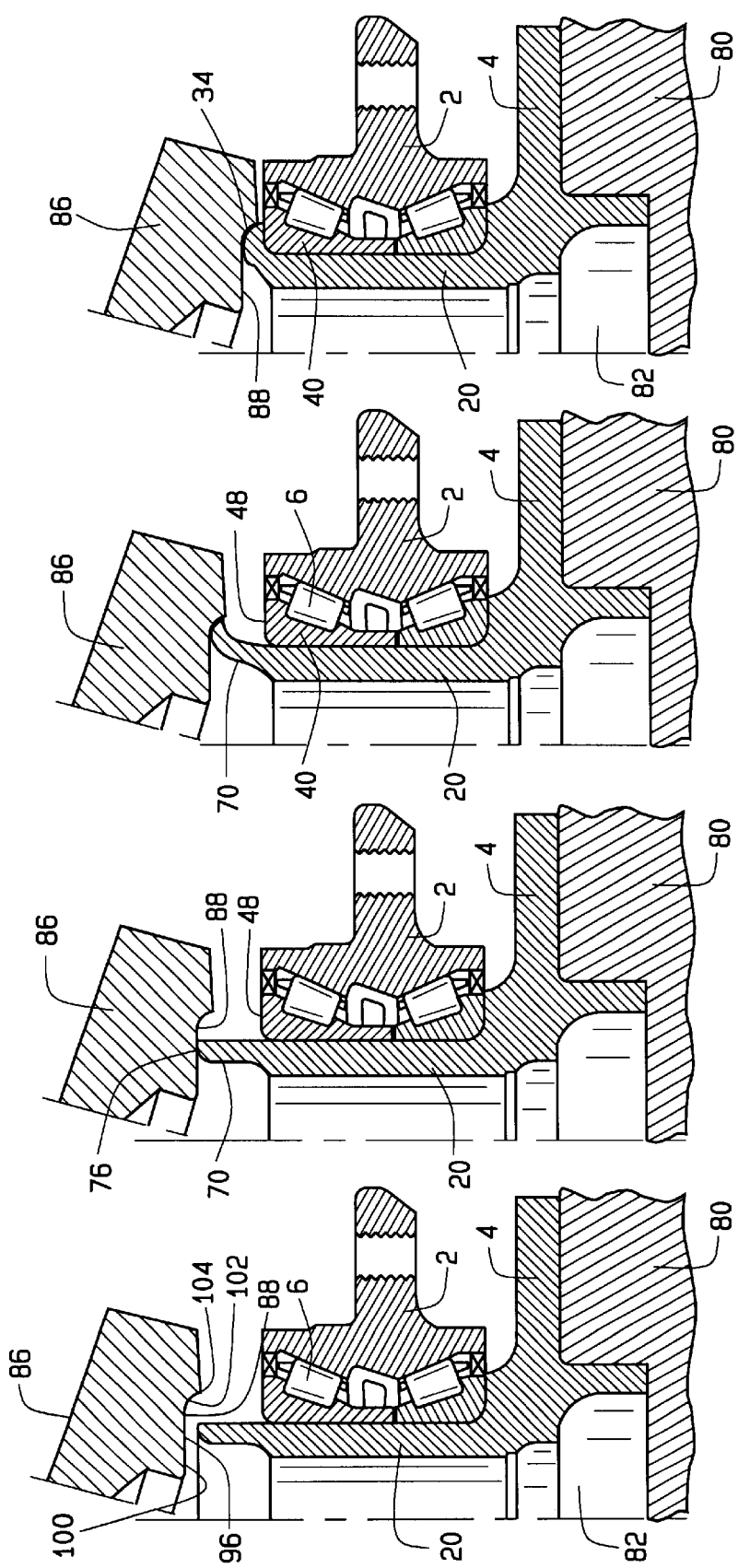
FIGS. 4 A, B, C, D are fragmentary sectional views, in sequence, showing the deformable end on the spindle being converted into a formed end which captures the bearing race.

Referring now to the drawings, a hub assembly A (FIG. 1), during the procedure under which it is assembled, has one of its components deformed against another of its components to unitize the assembly (FIG. 4). The processes utilized in deforming may leave the upset component with excessive deformation or incomplete deformation, either of which will adversely affect the operation of the hub assembly A. The process is monitored to ensure that the forces exerted at defined intervals and the rates at which such forces increase or decrease meet certain criteria—criteria which will identify a proper deformation.

With regard to the hub assembly A itself, it includes (FIG. 1) a housing 2, a hub 4 and a bearing 6 that is located between the housing 2 and the hub 4 to enable the hub 4 to rotate on the housing 2 about an axis X with minimal friction. The housing 2 is configured to be attached securely to a suspension system component of an automotive vehicle, whereas the hub 4 is configured to accommodate a brake rotor or drum and a road wheel. The bearing 6 transfers both radial loads and thrust loads in both axial directions between the housing 2 and the hub 4.

The housing 2 on its exterior has (FIG. 1) a triangular or rectangular flange 10 located generally midway between its ends and threaded holes 12 in the lobes of the flange 10. The flange 10 fits against a suspension system component, and the holes 12 receive machine screws which pass through the suspension system component and secure the housing 2 firmly to that component. Within its interior, the housing 2 has a pair of tapered raceways 14 which taper downwardly toward each other. At their large ends the raceways 14 open into counterbores 16 which in turn open out of the ends of the housing 2. The raceways 14 actually form part of the bearing 6, and in a sense the housing 2 constitutes the outer race of the bearing 6.

The hub 4 includes (FIG. 1) a spindle 20 which extends into the housing 2 and a flange 22 formed integral with the spindle 20 at the outboard end of the spindle 20. The hub flange 22 extends radially outwardly just past the flange 10 on the housing 2 and surrounds a wheel pilot 24 which projects from beyond its outboard face. The flange 22 carries several threaded studs 26 which likewise project beyond its outboard face. A brake disk fits over the threaded studs 26 and around the wheel pilot 24, as does a road wheel. Both are clamped tightly to the flange 22 by lug nuts which thread over the studs 26.

On its opposite face, that is its inboard face, the flange 22 has a shoulder 30 where it merges into the spindle 20, the outwardly presented surface of which forms a cylindrical bearing seat 32. At its inboard end, the spindle 20 turns outwardly away from the bearing seat 32 in the provision of a formed end 34. The spindle 20 in the region of the bearing seat 32 may be hollow or solid, but at its formed end 34 it is hollow.

The bearing 6 fits around the spindle 20 between the shoulder 30 and the formed end 34 and also fits within the housing 2. In addition to the two outer raceways 14, it includes (FIG. 1) inner races in the form of an outboard cone 38 and an inboard cone 40, each having a bore 42, which extends completely through it. The bores 42 of the two cones 38 and 40 receive the spindle 20 of the hub 4, there being interference fits between the bearing seat 32 and cone bores 42. Thus, the two cones 38 and 40 are captured on the spindle 20 between the shoulder 30 and the formed end 34. Each cone 38 and 40 is formed from case-hardened or through-hardened steel and has a tapered raceway 44 that is presented outwardly away from the axis X, a thrust rib 46 at the large end of its raceway 44, and a back face 48 which is on the end of the thrust rib 46 where it is squared off with respect to the axis X. The cone bore 42 opens out of the back face 48 at a radius.

The inboard cone 40 is somewhat longer than the outboard cone 38 by reason of a cone extension 50 which projects beyond the small end of its raceway 44 and may serve as a seat for a target wheel used to monitor the rotation of the hub 4.

The raceway 44 of the outboard cone 38 is presented toward the outboard raceway 14 in the housing 2 and tapers in the same direction, whereas the raceway 44 on the inboard cone 40 is presented toward the inboard raceway 14 of the housing 4 and tapers in the same direction as that raceway. Thus, the outboard raceways 14 and 44 are inclined in one direction, and the inboard raceways 14 and 44 are inclined in the opposite direction. The inboard cone 40 at its cone extension 50 abuts the small end of the outboard cone 38 along the bearing seat 32, that is to say, the two cones 38 and 40 abut at their front faces. The back face 46 of the outboard cone 38 abuts the shoulder 30 at the flange 22, while the back face 46 of the inboard cone 40 abuts the formed end 34 on the spindle 20. Thus, the two cones 38 and 40 are captured between the shoulder 30 and the formed end 34.

In addition to the cones 28 and 30 and the raceways 14 on the housing 4, the bearing 6 includes (FIG. 1) tapered rollers 56 arranged in two rows, there being a separate row around each cone 38 and 40. Actually, the rollers 56 extend around the raceways 44 for the cones 38 and 40, with their tapered side faces being along the raceways 44 and their large end faces against the thrust ribs 46. The rollers 56 of each row are essentially on apex, which means that the envelopes in which their tapered side faces lie have their apices located at a common point along the axis X. Each row of rollers 56 has a cage 58 to maintain the proper spacing between the rollers 56 in that row.

The counterbores 16 in the housing 2 contain seals 60 which fit around the thrust ribs 46 on the cones 38 and 40 to establish dynamic fluid barriers at the ends of the bearing 6 These barriers isolate the rollers 56 and the raceways 14 and 44 from road contaminants, such as water, ice-melting salts, and dirt.

The two cones 38 and 40 should actually contact each other, that is to say, they should abut at their front faces, and when they do, the bearing 6 will operate with the proper setting, which is usually preload, but may be end play. In preload, no internal clearances exist within the bearing 6, and the rollers 56 of the two rows snugly contact the raceways 14 and 44 for the full circumferences of those raceways 14 and 44. The preload, coupled with the interference fits between the bores 42 of the cones 38 and 40 and the bearing seat 32 of the spindle 20 enables the hub 4 to rotate relative to the housing 2 without any radial or axial free motion, thus assuring that the axis X remains stable. The formed end 34 must be located and otherwise configured to clamp the two cones 38 and 40 together, yet must not clamp them so tightly that their raceways 44 and thrust ribs 46 are distorted, for to do so could hasten failure of the bearing 6.

Figures 2, 3:
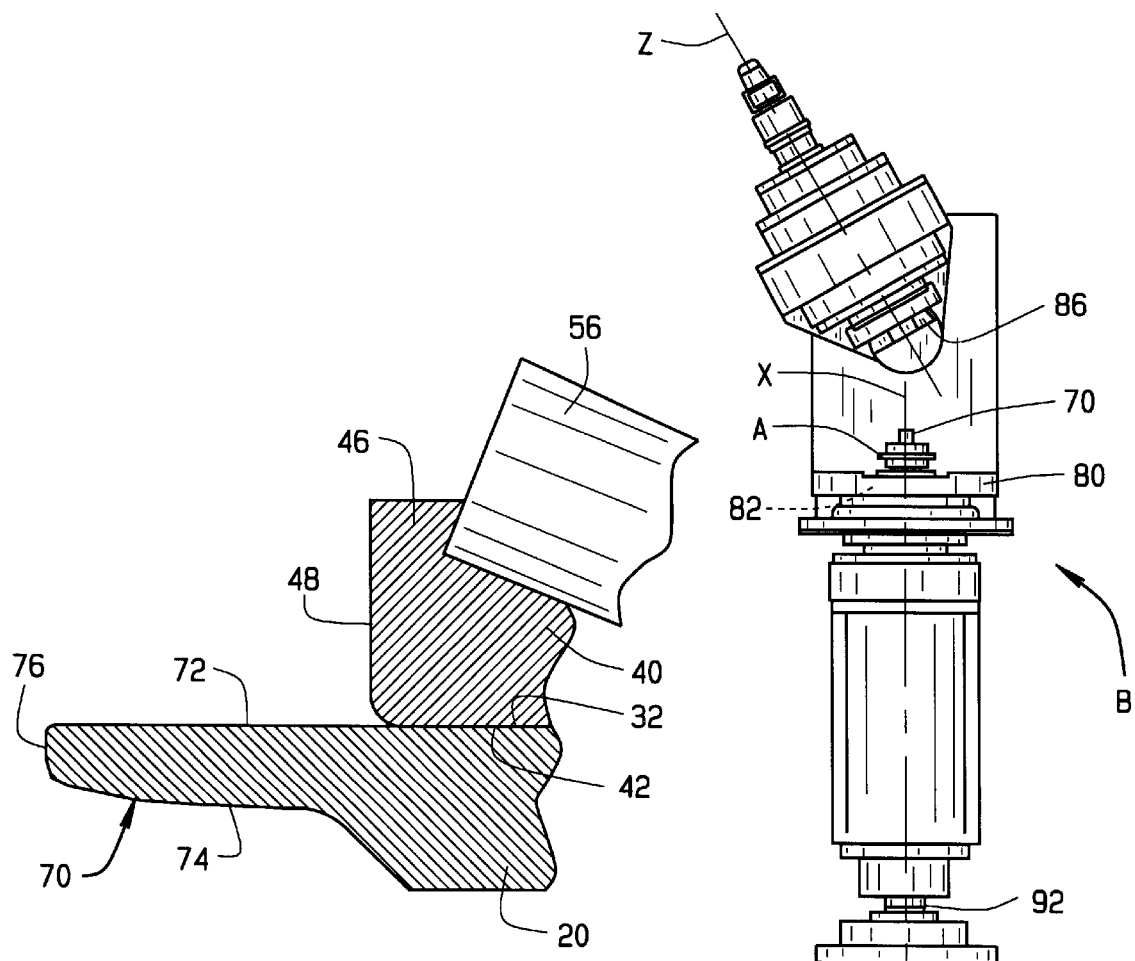
FIG. 2 is a fragmentary sectional view showing a deformable end on the spindle, which end is capable of being upset to capture a bearing race on the spindle.
FIG. 3 is an elevational view of a rotary forming machine used to upset the deformable end on the spindle of the hub assembly.

The formed end 34 unitizes the hub assembly A and is produced only after the two cones 38 and 40 are fitted over the bearing seat 32 of the spindle 20 with the rollers 56 around the cones 38 and 40 and the housing 2 around the rollers 56. Initially, the spindle 20 of the hub 4 extends from the shoulder 30 out to its inboard end at a diameter no greater than the diameter of the bearing seat 32. In this configuration the spindle 20 has a deformable end 70 (FIG. 2) which merges with the remainder of the spindle 20 at the end of the bearing seat 32, it being defined by a cylindrical exterior surface 72, a contoured interior surface 74 that is about as long as the exterior surface 72, and an end surface 76 that extends between the exterior and interior surfaces 72 and 74. The exterior surface 72 possesses the same diameter as the bearing seat 32 and merges into the bearing seat 32 without a discernable distinction between the two surfaces. Thus, the exterior surface 72 and the bearing seat 32 are flush. The presence of the interior surface 74 renders the deformable end 70 hollow. That interior surface 74 begins in the region where the bearing seat 32 ends and extends with a compound curvature out to the end surface 76. It possesses its least diameter at the proximal end of the deformable end 70 and its greatest diameter where it merges into the end surface 76 at the distal end of the deformable end 70. Its greatest inclination with respect to the axis X exists at its proximal end. The end surface 76 connects the exterior and interior surfaces 72 and 74, and in cross-section may range from almost flat to somewhat convex, particularly where it merges into the interior surface 74

The procedure for assembling the hub assembly A, of course, begins with the spindle of the hub 2 extended, that is to say, possessing the deformable end 70. First, the outboard cone 38, with its complement of rollers 56 around its raceway 44 and its seal 60 fitted over its thrust rib 46, is pressed over the exterior surface 72 on the deformable end 70 and then over the bearing seat 32 until its back face 48 comes against the shoulder 30. Next, the housing 2 is advanced over the spindle 20 and the outboard cone 38 as well. The counterbore 16 at the outboard end of the housing 4 aligns with the outboard seal 60 and, with continued advancement, that seal 60 is forced into the counterbore 16. The outboard raceway 14 in the housing 2 seats against the rollers 56 that surround outboard cone 38. Thereupon, the inboard cone 40, with its complement of rollers 56 around it, is forced over the exterior surface 72 on the deformable end 70 and advanced over the bearing seat 32 until its cone extension 50 abuts the end of the outboard cone 38. During the final increment of advance, the hub 4 is rotated relative to the housing 2 or vice versa to ensure that the rollers 56 in the two rows seat properly along the raceways 14 and 44 between which they are confined and against the thrust ribs 46 as well. At this juncture, the inboard seal 60 may be pressed into the inboard counterbore 16 of the housing 2 and over the thrust rib 46 of the inboard cone 40.

Once the inboard cone 40 is in place over the spindle 20, the deformable end 70 is upset and converted into the formed end 34 which captures the two cones 38 and 40 on spindle 20 of the hub 4, and the two cones 38 and 40 together with the rollers 56 that are around them hold the housing 2 around the hub spindle 20, preventing both radial and axial displacement, but leaving the hub 4 free to rotate relative to the housing 2 about the axis X.

International application PCT/GB98/01823, filed Jun. 22, 1998 and published Dec. 30, 1998 under International Publication No. WO 98/58762, discloses a rotary forming process for upsetting a deformable end that captures two cones on a spindle to unitize a hub assembly. However, the hub assembly that is produced should undergo an inspection to insure that formed end does not distort the bearing, yet captures the bearing firmly enough to insure that it operates in preload.

Basically, the process for converting the deformable end 70 into the formed end 34 utilizes a rotary forming machine B (FIG. 3) including a table 80 which is powered to rotate about a vertical axis Y and has an upwardly opening socket 82 configured to receive the pilot 24 on the hub 4 while supporting the entire hub assembly A on the flange 22 of the hub 4. The axis X of the hub assembly A aligns with the axis Y of the table 80, so that the spindle 20 and table 80 rotate in unison with their respective axes X and Y coinciding. The table 80 rotates opposite a forming tool 86 which in turn rotates about an axis Z that is oblique to, yet intersects, the axis Y of rotation for the table 80. The forming tool 86 has (FIG. 4) a contoured face 88 that is presented toward the deformable end 70 on the spindle 20 for the hub 4 supported on the table 80. Either the table 80 or the spindle 86 is fitted to a way which enables it to be displaced parallel to the axes X and Y, The displacement being provided by a hydraulic ram 90 or other force-producing device that is monitored by a load cell 92.

The contoured face 88 possesses an annular configuration and is depressed within the tool 86, it having (FIG. 4) a frustoconical inner region 100 and an outer region 102 that leads out to a peripheral edge 104. The diameter of the edge 104 equals the greatest diameter of the formed end 34 that is imparted to the hub spindle 20, yet is considerably larger than the diameter of the exterior surface 72 on the deformable end 70. Owing to the inclination of the axis Z for forming tool 86 with respect to the axis Y for the table 80 and with respect to the corresponding axis X of the hub spindle 20 on the table 80, one segment of the contoured face 88 for the tool 86 will be closer to the deformable end 70 than the remainder of the contoured face 88 (FIG. 4A). Indeed, the end surface 76 on the deformable end 70 is presented toward that segment. At that segment of the contoured face 96 the peripheral edge 104 aligns with the location on the back face 48 of the inboard cone 40 at which the periphery of the formed end 34 will locate after the deformable end 70 on the hub spindle 20 is converted into the formed end 34 (FIG. 4D).

To upset the deformable end 70, the table 80 rotates the hub 4 of the hub assembly A opposite the forming tool 84. The incomplete hub assembly A rests on the table 80 with its flange 22 against the table 80 and the deformable end 70 of its spindle 20 presented upwardly toward the forming tool 84. Then with the table 80 rotating, the ram 90 is energized. It brings the table 80—and of course the hub assembly A that is on the table 80—and the forming tool 86 together. The end surface 76 on the deformable end 70 comes against the frustoconical inner region 100 of the contoured face 88 on the tool 86 (FIG. 4B), whereupon the ram 90 exerts more force. The deformable end 70 deflects outwardly on the contoured face 88 of the tool 86, its end surface 76 moving over the inner region 100 of the contoured face 88 toward and into the arcuate outer region 102 (FIG. 4C). The tool 86 turns the deformable end 70 backwardly over the radius between the bore 42 and back face 48 of the inboard cone 40 and drives it against the back face 48, thus providing the formed end 34 with a flat face that serves as an abutment to retain the inboard cone 40 on the spindle 20. The exterior surface of the formed end 34 assumes the configuration of the arcuate outer region 102 and the adjoining inner region 100 of the contoured face 88 of the forming tool 86 (FIG. 4D). As the ram 90 urges the deformable end 70 of the spindle 20 and the forming tool 94 together, the load cell 92 monitors the force exerted by the ram 90.

Figure 5:
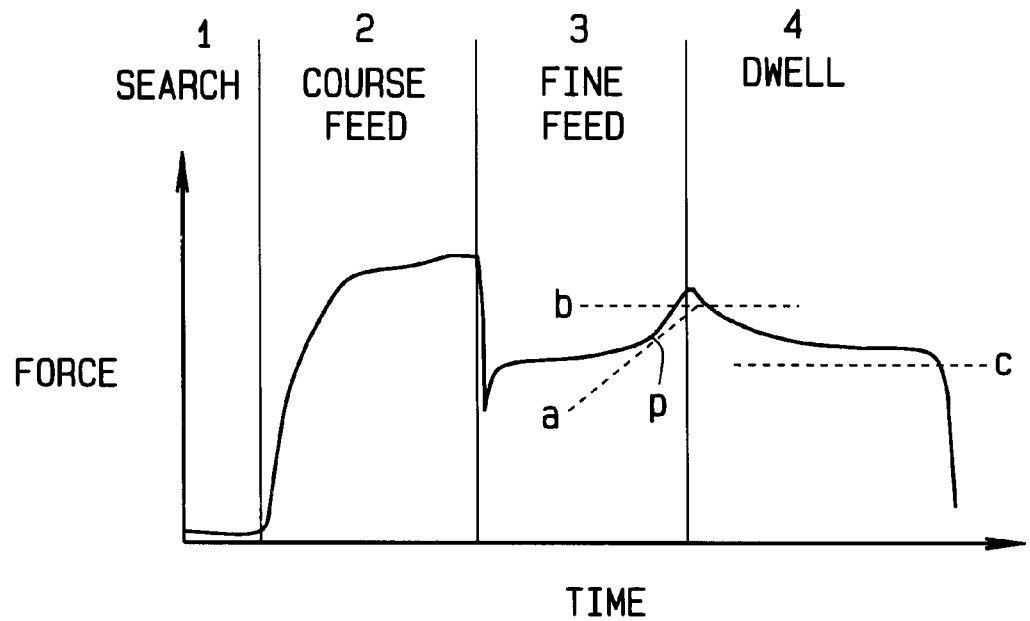
FIG. 5 is a graph representing one algorithm for monitoring the process for converting the deformable end on the spindle into a formed end.
Figure 6:
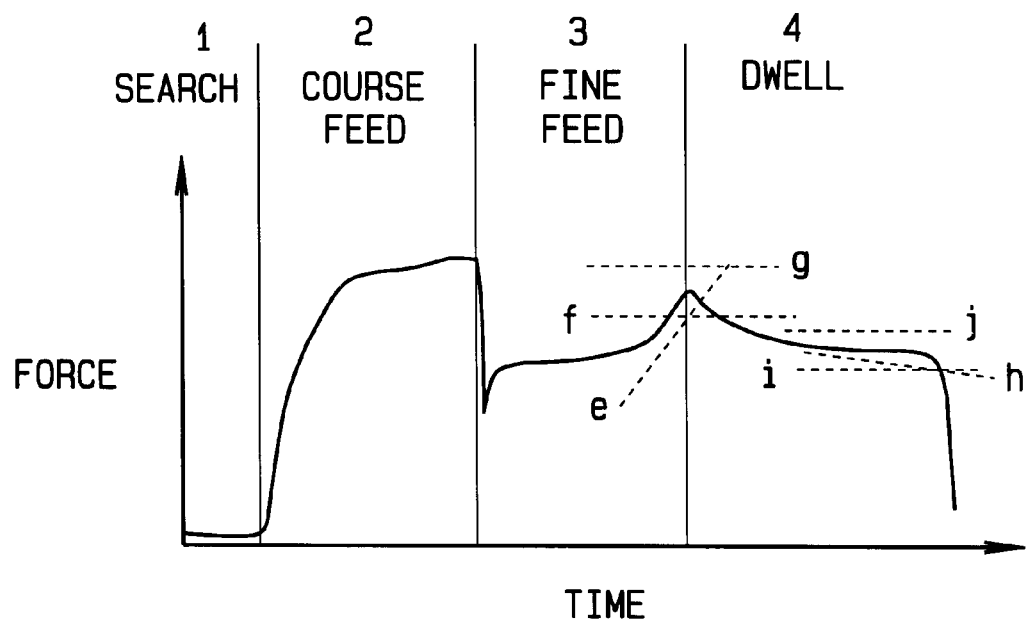
FIG. 6 is a graph representing another algorithm for monitoring the process.

The conversion of the deformable end 70 on the spindle 20 and the formed end 34 occurs in three stages or phases—or perhaps four—represented by different rates of feed for bringing the deformable end 70 and the forming tool 86 together and varying forces exerted by the ram 90 and monitored by the load cell 92, and those forces are perhaps best analyzed from a plot of force against time on Cartesian coordinates (FIGS. 5 & 6). However, before forming tool 86 actually comes in contact with the deformable end 70, the forming machine B preferably determines the location of the back face 48 of the inboard cone 40 along the axes X and Y. However, if the machine B does not actually measure the location of the back face 48 for the inboard cone 40, the machine B may rely on a statistical stackup determined at the setup of the incomplete hub assembly A on the machine B.

If one considers the conversion in terms of four phases, the first could be considered search phase. In this phase the hub 4 and the forming tool 86 approach quite rapidly, (FIG. 4A), but since no resistance is encountered, the force exerted by the ram 90 is minimal. A steep rise in the force occurs when the end surface 76 on the deformable end 70 of the spindle 20 contacts the inner region 100 of the contoured face 88 in the tool 86 (FIG. 4B). This marks the onset of the second phase, and the machine B registers the location along the axes X and Y at which it occurs. Here the ram 90 transforms to a course feed, which is slower than the search feed of the first phase. The force exerted by the ram 90 during the course feed or second phase rises rapidly, but thereafter the rate of increase, when measured against time, diminishes. During the second phase the forming tool 86 moves the metal of the end portion 70 at a high rate of speed, and the end surface 76 moves outwardly over the inner region 100 of the contoured face 96 and into the outer region 102 (FIG. 4C). It then turns backwardly toward the back face 48 of the inboard cone 40 and essentially assumes the configuration of the formed end 34 FIG. 4D), although with a gap between that end 34 and the back face 48 of the inboard cone 40. The course feed or second phase ends after the tool 86 and table 80 are brought together a prescribed distance measured from the location that marked the onset of the second phase, and that leaves the tool 86 a prescribed distance from the back face 48 of the inboard cone 40. At the transition between the second phase and the third phase, the ram 90 converts to a fine feed, and the force exerted immediately drops. However, as the ram 90 continues to bring the spindle 20 and the forming tool 86 together, albeit at a slower speed, the metal at the end of the spindle 20 continues to flow—indeed, toward the back face 48 of the inboard cone 40 (FIG. 4D). The force exerted, after experiencing the initial drop and a sharp subsequent rise of short duration, continues to increase at a moderate and generally uniform rate. However, as the metal of the formed end 34 forms up into its final configuration against the back face 48 of the inboard core 40, the rate of increase in force per unit of time increases, signifying that the formed end 34 has indeed come against the back face 48 of the inboard cone 40. The forming tool 86 and hub spindle 20 close upon each other for a prescribed distance so that at the end of the third phase the forming tool 86 is a prescribed distance from the back face 48 of the inboard cone 40. The end of the third phase is marked by an end of the closure of the spindle 20 upon the forming tool 86, yet without a separation of the spindle 20 from the forming tool 86. In short, the fourth phase represents a dwell in which the spindle 20 and forming tool 86 remained fixed in position, save for the rotation. During the fourth phase, the force exerted by the ram 90 at first diminishes and then becomes nearly constant. At this time the formed end 34 assumes its final configuration in which it bears snugly against the back face 48 of the inboard cone 40 and clamps the two cones 38 and 40 together, with the proper setting in the bearing 6, which is usually in preload.

Too much or too little metal in the deformable end 70—or more accurately in the portion of the deformable end 70 that projects beyond the back face 48 of the inboard cone 40—will cause the third and fourth phases, and most likely both, to deviate somewhat from that described, and the deviations serve to identify defective hub assemblies A which require rejection. For example, the failure of the third phase to produce a spike in the force near its end suggests that the formed end 34 has not made tight contact with the back face 48 of the inboard cone 40. In other words, the average rate of increase toward the end of the third phase must exceed a minimal value to insure that the formed end 34 is seated firmly against the back face 48 of the inboard cone 40. If the maximum force exerted at the end of the third phase fails to reach a prescribed minimum, that too will indicate that the formed end 34 has not fully seated. So will the absence of a generally uniform force during the fourth phase or dwell. Indeed, even a moderate decline in the force toward the end of the fourth phase suggests that the metal in the formed end 34 is still moving away from the forming tool 94.

On the other hand, if the force exerted at the end of the third phase exceeds a prescribed maximum, a good possibility exists that the inboard cone 40 experienced some deformation at its thrust rib 46. Exceeding a prescribed maximum in the fourth phase will also reflect excessive force at the thrust rib 46 of the inboard cone 38.

The evaluation of the force at progressive intervals lends itself to several algorithms for identifying hub assemblies A which should be rejected. This evaluation is best undertaken from a consideration of the plot of force against time for an acceptable hub assembly A (FIGS. 5 & 6).

One algorithm (FIG. 5) considers the following criteria from the comparison of force against time, and the failure to fall within the limits for any one of those criteria should result in a rejection of the hub assembly A:

1. The rate a of increase in force leading up to maximum force at the end of the third or fine feed phase. A spike at the final increment of the fine feed indicates that the formed end 34 has made contact with the back face 48 of the inboard cone 40 and has thus encountered greater resistance to the flow of metal. In other words, the load curve must exhibit a moderate slope and then a steeper slope immediately before the end of the fine feed, with a inflection point p between the two slopes, and the steep slope must exceed a prescribed slope a.

2. The peak force during the fine feed, which should be at the end of the third phase, must exceed a prescribed minimum b. This will verify that the formed end 34 has seated against the face 48 of the inboard cone 40.

3. The average rate of increase of force during the fine feed or third phase must exceed a prescribed minimum, with average being calculated as a moving average from equally spaced data points, perhaps five spaced 0.01 seconds apart. This ensures the presence of a force spike at the end of the fine feed, and provides an additional check on the closure of the gap between the formed end 34 and the cone back face 48.

4. The force during the dwell or fourth phase, after the initial decrease in that force, must remain relatively constant and above a prescribed minimum c. If the force continues to decrease during the dwell period or falls below the prescribed minimum c, the formed end 34 may not have fully closed on the cone back face 48.

Another algorithm (FIG. 6) considers the following criteria in the comparison of force against time, and a violation of the limits set for any one should result in a rejection of the hub assembly A:

1. The rate of increase in force approaching the end of the fine feed or third phase. This is determined by measuring the rate (slope) at equally spaced data points immediately prior to the force at the end of the fine feed and taking a moving average. An average rate (slope) that lies below a prescribed minimum rate e suggests the absence of closure between the formed end 34 and the cone back face 48.

2. The maximum force achieved during the fine feed or third phase. This force should exceed a prescribed minimum f—indeed, a minimum which generally assures a closure of the formed end 34 on the cone back face 48. Then, again it should lie below a prescribed maximum g which generally represents a force at which the thrust rib 46 of the inboard cone 40 will deform. In short, the maximum force during the fine feed should lie between prescribed maximum and minimum forces f and g, respectively.

3. The change in the rate at which the force decreases approaching the end of the fourth or dwell phase. The rate cannot decrease too rapidly, for if it did, it would signify that the metal is still moving away from the forming tool 94 during the dwell phase. In other words, the slope of the load curve near the end of the fourth phase must remain below a prescribed maximum h.

4. The average force during the portion of the fourth or dwell phase that follows the initial decrease in the force after the entry into the fourth or dwell phase. This average force must remain above a prescribed minimum i to verify that the formed end 34 has closed on the cone back face 48, yet must be below a prescribed maximum j. If the force exceeds the prescribed maximum j, it may distort the cone thrust rib 46.

The load cell 92 produces an electrical signal which is directed to a microprocessor that further receives a time signal from a clock to provide the time base. The microprocessor recognizes the magnitude of the force registered at any instant by the load cell 92 and the time at which it occurs, in effect producing a load curve (FIGS. 5 & 6). The microprocessor also has registered with it maximum and minimum limits for force and slopes during the third and fourth phases. These limits may include maximum and minimum forces b, f, g, for the portion of the load curve leading to the transition between the third and fourth phases, maximum and minimum forces c, i, g for the portion of the load curve approaching the end of the fourth phase, a minimum slope a, e for the portion of the slope leading up to the transition between the third and fourth phases, and a maximum slope h for the load curve where it approaches the end of the fourth phase. Finally, the microprocessor registers the initial position of the back face 48 for the inboard core 40 along the axes X and Y and ascertains the spacing between that back face 48 and the position of the forming tool 86 at the outset of the second phase. It retains a prescribed distance for closure between the back face 48 and forming tool 86 for both the second and third phases and controls the closure so that the second and third phase experience the correct closure.

No two rotary forming machines B function the same, much less any two forming tools 86. The maximum and minimum forces and slopes suited for one machine B and tool 86 generally do not apply to another machine B and tool 86. Thus, the level for the force and slope with each machine B and tool 94 must be established empirically. Through a series of calibrating runs and measurements made manually on the completed hub assemblies A produced in these runs, one can determine the magnitude of maximum and minimum forces and slopes beyond which unacceptable hub assemblies A result.

The outboard inner race 38 may be formed integral with the spindle 20, in which event the outboard inner raceway 44 is on the spindle 20. Also, the outboard raceway 14 may be on a separate double cup pressed into the housing 2 or on two single cups likewise pressed into the housing 4. The bearing 6 need not be a tapered roller bearing, but instead an angular contact bearing or any other antifriction bearing capable of accommodating thrust loading. The formed end need not be directly against the back face 48 of the inboard cone 40, but instead may be against an intervening member such as a ring or flange that is captured between the formed end 34 and the cone back face 48. In that event, the end of the intervening member is considered the cone back face 48.

| PROCESS FOR CAPTURING A BEARING RACE ON A SPINDLE | |
|---|---|
| A | hub assembly |
| B | rotary forming machine |
| X | axis |
| 2 | housing |
| 4 | hub |
| 6 | bearing |
| 10 | flange |
| 12 | threaded holes |
| 14 | raceways |
| 16 | counterbores |
| 20 | spindle |
| 22 | flange |
| 24 | wheel pilot |
| 26 | threaded studs |
| 30 | shoulder |
| 32 | bearing seat |
| 34 | formed end |
| 38 | outboard cone |
| 40 | inboard cone |
| 42 | bore |
| 44 | tapered raceway |
| 46 | thrust rib |
| 48 | back face |
| 50 | cone extension |
| 56 | rollers |
| 58 | cage |
| 60 | seals |
| 70 | deformable end |
| 72 | exterior surface |
| 74 | interior surface |
| 76 | end surface |
| 80 | table |
| 82 | socket |
| 86 | forming tool |
| 88 | contoured face |
| 90 | hydraulic ram |
| 92 | load cell |
| 100 | inner region |
| 102 | outer region |
| 104 | peripheral edge |

What is claimed is:

1. A process for upsetting a hollow deformable end on a spindle that projects through an inner race of an antifriction bearing, with the inner race having a back face beyond which the deformable end is located, said process comprising: rotating the spindle and a forming tool located beyond the spindle; forcing the rotating forming tool and the deformable end of the spindle together; while the force is exerted and the spindle and tool are rotating, decreasing the distance between forming tool and the inner race in a feed phase so that the deformable end transforms into a formed end that is directed outwardly and located opposite the back face of the inner race; thereafter, while the force is applied, maintaining the distance between the forming tool and the inner race essentially constant in a dwell phase; monitoring the force at which the spindle and the forming tool are urged together in the feed and dwell phases; and determining if the force at prescribed intervals meets established criteria for rejection of the spindle and antifriction bearing.

2. The process according to claim 1 wherein the criteria includes a minimum force at the end of the feed phase immediately prior to the dwell phase.

3. The process according to claim 1 wherein the criteria also includes a minimum rate of increase in the force immediately prior to the dwell phase.

4. The process according to claim 1 wherein the criteria also includes a maximum force at the end of the feed phase.

5. The process according to claim 1 wherein the force decreases during the dwell phase and the criteria further includes a maximum in the rate of decrease approaching the end of the dwell phase.

6. The process according to claim 1 wherein the criteria also includes a minimum average force approaching the end of the dwell phase.

7. The process according to claim 1 wherein the criteria also includes detection of an inflection point representing a change in the rate of force increase during the feed phase.

8. A process for creating a formed end on a spindle to capture an inner race on the spindle, with the spindle initially having a deformable end over which the inner race has passed such that the deformable end projects beyond the back face of the inner race, said process comprising: locating a forming tool opposite the deformable end of the spindle; bringing the forming tool and spindle together so that the deformable end contacts the forming tool; causing the deformable end and forming tool to rotate; effecting a coarse feed between the spindle and the forming tool wherein the spindle and forming tool while they are rotating are forced together and the deformable end deforms outwardly; thereafter effecting a fine feed between the spindle and the forming tool wherein the spindle and forming tool are forced still closer together at a lesser speed of closure upon each other and the deformable end transforms into a formed end that is located opposite the back face of the inner race; thereafter maintaining a dwell in which the distance between the forming tool and the inner race remains essentially constant while force is still exerted so that the formed end remains against the forming tool; monitoring the force with which the spindle and forming tool are urged together; and identifying whether or not the spindle has a formed end produced with a force that fails to rise with respect to time at a prescribed rate approaching the end of the fine feed.

9. The process according to claim 8 and further comprising identifying whether or not the spindle has a formed end that is produced with a force that fails to exceed a prescribed minimum force at the end of the fine feed.

10. The process according to claim 8 and further comprising identifying whether or not the spindle has a formed end that is produced with a force that exceeds a prescribed maximum force at the end of the fine feed.

11. The process according to claim 8 and further comprising identifying whether or not the spindle is produced with a force that is less than a prescribed minimum force during the dwell.

12. The process according to claim 8 and further comprising identifying whether or not the spindle is produced with a force which declines at a rate greater than a prescribed minimum rate approaching the end of the dwell.

13. The process according to claim 8 and further comprising identifying whether or not the formed end on the spindle is produced with an average force approaching the end of the dwell that fails to exceed a prescribed minimum.

14. The process according to claim 1 wherein the spindle forms part of a hub having a flange from which the spindle projects; wherein a housing surrounds the spindle and the bearing is located between the housing and spindle, all to form a hub assembly.

15. The process according to claim 14 and further comprising identifying whether or not the rate of increase in the force approaching to the end of the fine feed fails to exceed a prescribed minimum rate.

16. The process according to claim 14, and further comprising identifying whether or not the force at the end of the fine feed exceeds a prescribed maximum.

17. The process according to claim 14 and further comprising identifying whether or not the rate of change in force approaching the end of the dwell exceeds a prescribed maximum.

18. The process according to claim 14 and further comprising identifying whether or not the average force approaching the end of the dwell is less than a prescribed average force.

19. The process according to claim 14 and further comprising identifying whether or not the force at the conclusion of the feed phase fails to exceed a prescribed minimum and fails to exceed another prescribed minimum approaching the end of the dwell phase.

* * * * *